(12) United States Patent
Moeller

(10) Patent No.: US 11,457,611 B2
(45) Date of Patent: Oct. 4, 2022

(54) WINDING DEVICE FOR AN ANIMAL LEASH

(71) Applicant: Wolfgang Moeller, Bochum (DE)

(72) Inventor: Wolfgang Moeller, Bochum (DE)

( * ) Notice: Subject to any disclaimer, the term of this patent is extended or adjusted under 35 U.S.C. 154(b) by 365 days.

(21) Appl. No.: 16/758,486

(22) PCT Filed: Oct. 20, 2018

(86) PCT No.: PCT/DE2018/000303
§ 371 (c)(1),
(2) Date: Apr. 23, 2020

(87) PCT Pub. No.: WO2019/080954
PCT Pub. Date: May 2, 2019

(65) Prior Publication Data
US 2020/0245593 A1 Aug. 6, 2020

(30) Foreign Application Priority Data
Oct. 25, 2017 (DE) ...................... 10 2017 125 015.8

(51) Int. Cl.
*A01K 27/00* (2006.01)
*B65H 75/40* (2006.01)
*B65H 75/44* (2006.01)

(52) U.S. Cl.
CPC ......... *A01K 27/004* (2013.01); *B65H 75/406* (2013.01); *B65H 75/4431* (2013.01); *B65H 2701/35* (2013.01)

(58) Field of Classification Search
CPC .... A01K 27/004; A01K 27/00; A01K 27/003; A01K 27/002; A01K 27/005
See application file for complete search history.

(56) References Cited

U.S. PATENT DOCUMENTS 5,443,037 A 8/1995 Saleme
2014/0033991 A1* 2/2014 Almeida ............. A01K 27/004
119/771
(Continued)

FOREIGN PATENT DOCUMENTS

CN 201308048 Y 9/2009
DE 85 27 780 U 12/1985
(Continued)

OTHER PUBLICATIONS

International Search Report in PCT/DE2018/000303, dated Feb. 20, 2019.

*Primary Examiner* — Kristen C Hayes
(74) *Attorney, Agent, or Firm* — Collard & Roe, P.C.

(57) ABSTRACT

The invention relates to a winding device for an animal leash (1), in particular for a dog leash, comprising a housing (1) which houses the leash (3) and has a pull-out limiting device and a retaining ring (4) having an engagement opening (5), said retaining ring (4) having a pivot arm (4a) which is connected to the retaining ring (4) by means a pivot joint (6), closes the engagement opening (5) of the retaining ring (4) in its non-pivoted position and releases the engagement opening (5) of the retaining ring (4) in its pivoted position. In order to be able to use such a winding device in a simple manner to secure a dog in a motor vehicle in compliance with safety regulations, according to the invention, a lock tongue (11) is arranged at the pivot arm (4a) at its end facing away from the pivot joint (6) or at the retaining ring (4) at its end facing the pivot arm (4a), which tongue (11) can be inserted into a motor vehicle belt buckle when the retaining ring (4) is open.

6 Claims, 2 Drawing Sheets

(56) References Cited

U.S. PATENT DOCUMENTS

Figure 3:
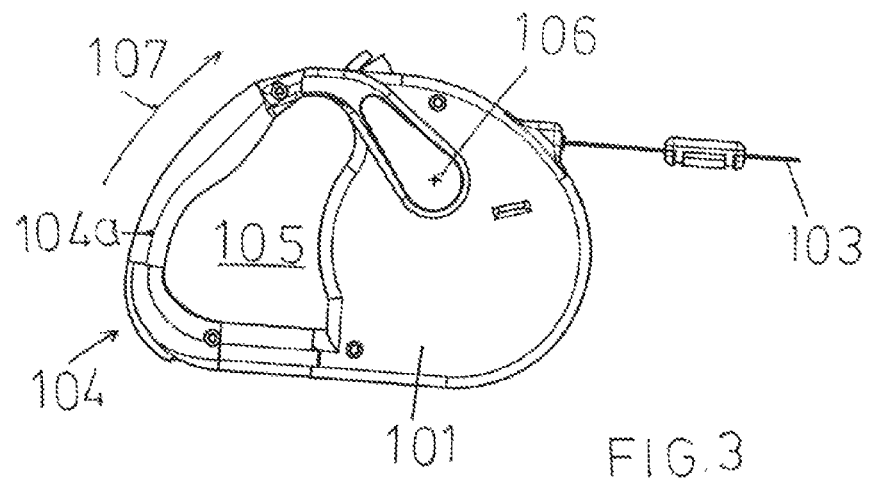

2014/0165925 A1* 6/2014 Almeida .............. A01K 27/005
    119/771
2016/0227732 A1* 8/2016 Pompey ............... A01K 1/0263
2017/0021798 A1* 1/2017 Sanchez Huipio .. A01K 27/003

FOREIGN PATENT DOCUMENTS

DE          101 19 581 C2     3/2003
JP          2003274787 A      9/2003

* cited by examiner

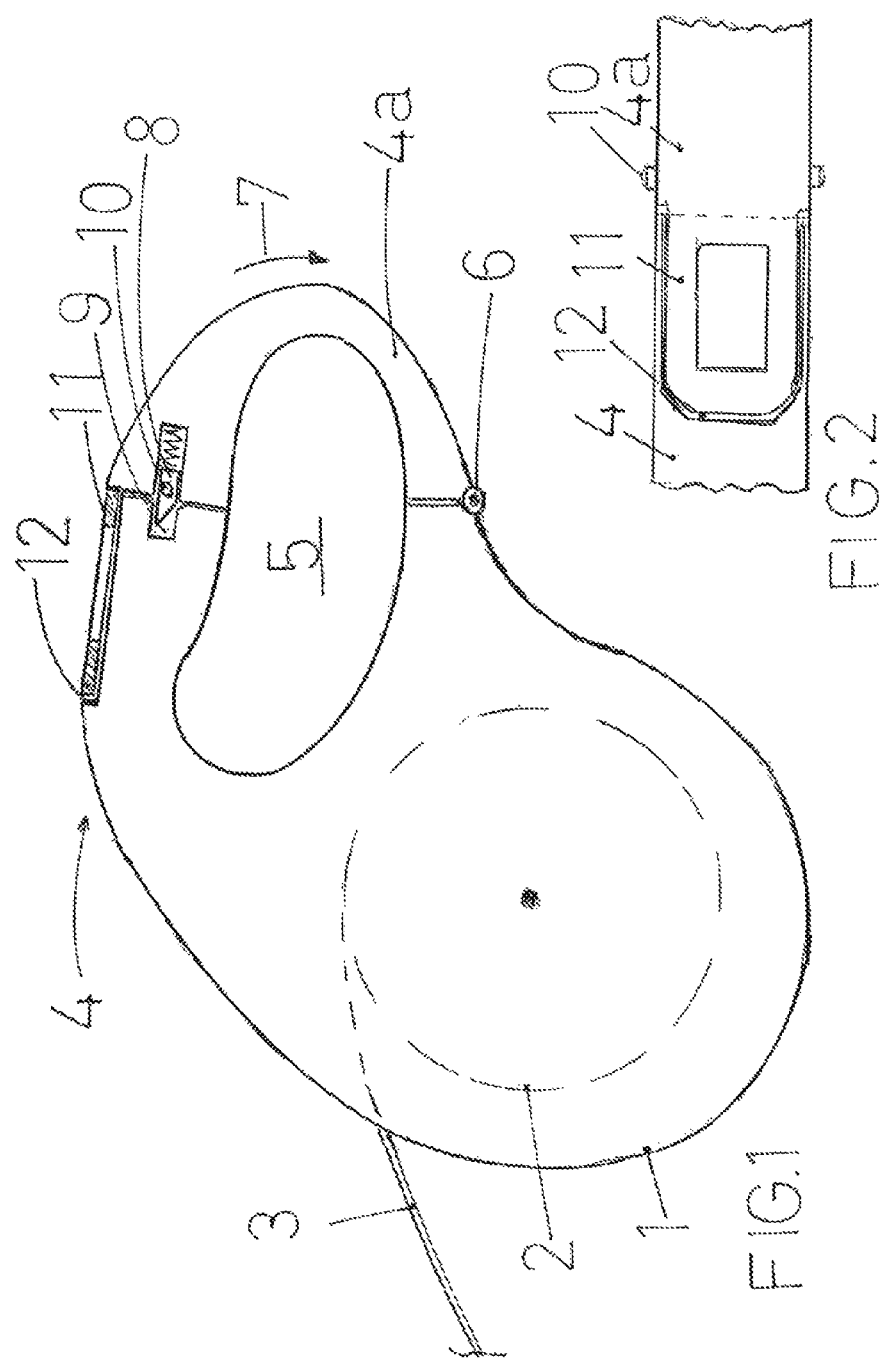

WINDING DEVICE FOR AN ANIMAL LEASH

CROSS REFERENCE TO RELATED APPLICATIONS

This application is the National Stage of PCT/DE2018/000303 filed on Oct. 20, 2018, which claims priority under 35 U.S.C. § 119 of German Application No. 10 2017 125 015.8 filed on Oct. 25, 2017, the disclosure of which is incorporated by reference. The international application under PCT article 21(2) was not published in English.

The invention relates to a winding device for an animal leash, in particular for a dog leash, comprising a housing which houses the leash and has a pull-out limiting device and a retaining ring having an engagement opening, said retaining ring having a pivot arm which is connected to the retaining ring by means a pivot joint, closes the engagement opening of the retaining ring in its non-pivoted position and releases the engagement opening of the retaining ring in its pivoted position. Such a roll-up device is, for example, known from the German utility model DE-U-85 27 780.

Recently, winding devices for dog leashes with a pull-out limiter have proven to be extremely successful and are available in various designs and with various additional features (e.g. lights, acoustic signaling devices, manure bag storage, etc.). The special advantage of such winding devices is first of all that the dog can be led with the help of the extension limiter either on a long leash or also on a very short leash.

The winding device of the type mentioned above also offers the possibility of simple and secure attachment of the winding device to any fastening points, e.g. to rings or poles in front of shops or to grids, fences, furniture, park benches etc., where the leashed dog is to remain temporarily.

For this purpose, the retaining ring of the housing is provided with a pivot arm which is connected to the retaining ring by means of a pivot joint and which in its non-pivoted position (closed position) closes the engagement opening of the retaining ring and in its pivoted position (open position) releases the engagement opening of the retaining ring. A retaining ring designed in this way can, after pivoting its pivot arm into the open position, be hung with its engagement opening as desired over suitable fastening points and secured there by pivoting the pivot arm back in the manner of a snap hook.

A special problem arises if the dog, which is guided by the winding device, is to be taken along in a motor vehicle. According to the relevant provisions of the German Road Traffic Regulations, it must be ensured that a dog carried in a vehicle cannot obstruct or distract the driver. Any violation of this safety obligation will be punished according to the relevant regulations with an administrative fine and an entry in the driving suitability register. For this reason, it is customary either to lock the dog in a cage or cage compartment of the vehicle or to strap the dog with a suitable collar or, even better, a chest harness in the area of the rear seat of the vehicle. Such restraint systems are known, for example, from U.S. Pat. No. 5,443,037 A or DE 101 19 581 C2.

Especially in this context, separate adapters are kno, which are arranged between the dog's collar or chest harness on the one hand and the belt buckle of a vehicle restraint system on the other hand, which are provided at one end with connecting means for attachment to the collar or chest harness of the dog and at the other end with a buckle tongue for insertion into a belt buckle located in the vehicle and which is already present according to the legal regulations.

The disadvantage of such separate adapters is that they must be removed whenever the buckle is used for any other purpose, e.g. when passengers are carried on the rear bench, and can therefore easily be lost or misplaced in the vehicle. As a result, it is relatively common for dogs to be carried in the vehicle without being properly secured.

It is therefore the object of the invention to remedy this situation.

The subject of the invention is a winding device for an animal leash, in particular for a dog leash, comprising a housing which houses the leash and has a pull-out limiting device and a retaining ring having an engagement opening, said retaining ring having a pivot arm which is connected to the retaining ring by means a pivot joint, closes the engagement opening of the retaining ring in its non-pivoted position and releases the engagement opening of the retaining ring in its pivoted position, this retractor device being characterized in, that a lock tongue is arranged at the pivot arm at its end facing away from the pivot joint or at the retaining ring at its end facing the pivot arm, which tongue can be inserted into a motor vehicle belt buckle when the retaining ring is open.

The invention makes it possible for the first time to connect the winding device directly to the belt buckle of the restraint system of the vehicle, which is in any case present in accordance with the legal regulations, and thus to secure the dog on a sufficiently short leash in accordance with the legal regulations, without a separate adapter or similar installations. The new winding device therefore has an additional function that makes dog keeping noticeable easier. In particular, the new winding device also opens up the possibility of taking the dog in a vehicle if necessary, if there are no other special devices for animal safety. The special arrangement of the lock tongue on the parts of the retaining ring proposed according to the invention enables a particularly space-saving integration of the lock tongue into the retaining ring without impairing its actual function. The invention makes it possible for the first time to connect the retractor device directly to the seatbelt buckle of the seatbelt buckle which is designed according to the legal requirements.

A particularly preferred embodiment of the invention provides that the lock tongue extends in the circumferential direction of the retaining ring and, when the retaining ring is closed, lies in a suitable recess in the retaining ring or the retaining ring pivot arm. This makes it possible to integrate the look tongue into the retaining ring in such a way that it does not protrude anywhere over its contours and does not require any additional space for its accommodation.

It is also expediently provided that the pivot arm can be pivoted outward with respect to the engagement opening of the retaining ring. This on the one hand facilitates the fastening of the retaining ring at any fastening points and also ensures good accessibility of, the lock tongue connected to the retaining ring.

For the secure fixing of the retaining ring at any fastening points, it is provided that the pivot arm is provided at its end facing away from the pivot joint with a locking device with which the pivot arm can be fixed in the closed position. This locking device ensures that the retaining ring at the wrong time, e.g. if the dog moves violently from the attachment point.

In order to simplify the handling of the new winding device, it is further provided that the pivot joint carrying the pivot arm is designed as a spring joint, which holds the pivot arm elastically in the open position. This spring joint h olds the pivot arm in the open position during the fastening process and thus makes it easier for the user to fasten it to any fastening point as well as to a vehicle belt buckle. In order to close the retaining ring, the user of this embodiment of the winding device pushes the pivot am against the spring force into its closed position, in which the above-mentioned locking takes place.

Finally, it is provided that the locking element at the end of the pivot arm is designed as a spring-loaded snap lock, which is provided with handle elements for opening by hand. This snap lock engages automatically at the end of the closing path of the pivot arm and can be unlocked by pulling back by hand, after which the pivot arm jumps into the opening position necessary for the above-described fastening operations by the action of the spring joint mentioned above.

Two exemplary embodiments of the invention are explained in more detail below with reference to the drawing.

Figure 4:
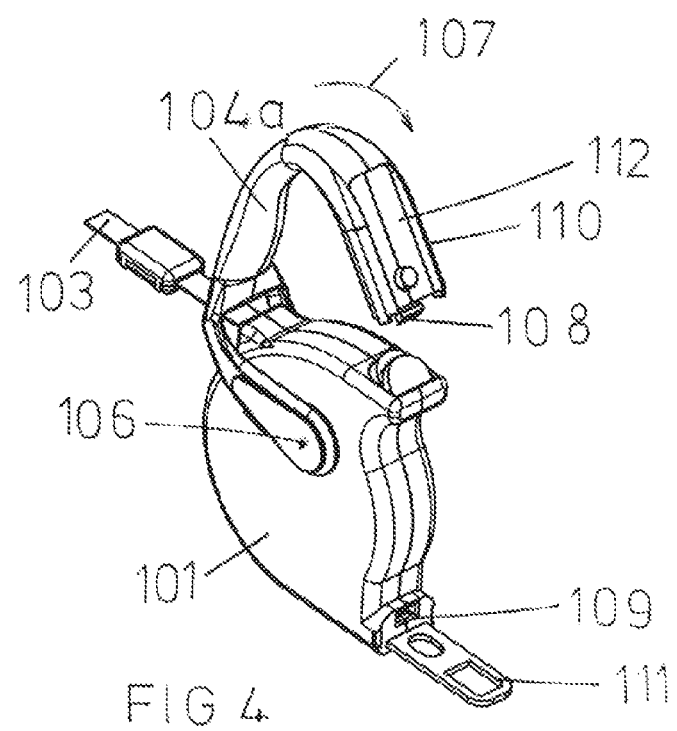

FIG. 1: Schematically a side view of a winding device according to the invention in a first version;

FIG. 2: A top view of the locking area between the retaining ring and the pivot arm of the winding device shown in FIG. 1;

FIG. 3: A side view of a winding device according to the invention in a second embodiment;

FIG. 4: A perspective view of the winding device shown in FIG. 3 in the open position.

In the drawing, the housing of a winding is marked with the reference mark 1. In the housing 1 there is a take-up reel 2, onto which a dog leash 3 is wound, which is led out of the housing 1 at the side. Furthermore, the housing has an extension limiter not shown in the drawing, with which it is possible to fix the extension length of the dog leash as desired by hand.

On its side facing away from the exit opening of the dog leash 3, the housing 1 is provided with a retaining ring 4, which encloses an access opening 5. This retaining ring 4 has a pivot arm 4a, which is connected to the housing 1 via a pivot joint 6, which together with the pivot arm 4a encloses the access opening 5 and thus forms the retaining ring 4. Around this pivot joint 6, the pivot arm 4a can be pivoted in the direction of the arrow 7 to an open position in which the engagement opening 5 is open to one side and forms a kind of hook which can be used to secure the housing 1 at any fastening point and whose hook opening can be closed by the pivot arm 4a, so as to secure the housing at any fastening point.

At its end opposite to the pivot joint 6, the pivot arm 4a is provided with a locking element in the form of a spring-loaded latch 8 which engages in an opposite snap-in opening 9 on the housing 1 and fixes the pivot arm 4a in the closed position shown in FIG. 1. The latch 8 is provided with laterally protruding handle elements 10 with which the lock can be released manually if necessary.

In accordance with the invention, the pivot arm 4a is provided with a lock tongue 11 at its end facing away from the pivot joint 6, which can be inserted into a motor vehicle seat belt buckle when the retaining ring 4 is open. This lock tongue 11 has the shape customary in motor vehicle belt buckles and, when the retaining ring 4 is closed, lies in a suitable recess 12 on the outer circumference of the retaining ring 4 in such a way that it does not project beyond the outer circumference of the retaining ring 4.

The pivot joint 6 is spring-loaded in the opening direction, so that after unlocking the snap latch 8 the pivot arm 4a jumps by itself into the open position, in which both the engagement opening 5 for fastening the housing 1 to any fastening points and the latch tongue 11 for securing the housing to a belt buckle in the motor vehicle are freely accessible. To close the retaining ring 4, the pivot arm 4a is pressed against the direction of the arrow 7 and against the spring force of the pivot joint 6 into the closed position shown in FIG. 1 until the latch 8 snaps into the snap-in opening 9, thus locking the retaining ring 4.

Alternatively—to a certain extent in kinematic reversal—according to the teaching of invention, the lock tongue 11 can also be located on the section of the housing 1 facing the free end of the pivot arm 4a. In this case, of course, a recess in the pivot arm 4a is provided to accommodate the lock tongue 11.

In deviation from the design example shown in FIG. 1 and without impairing the inventive function, the pivot arm 4a can also be arranged the other direction, so that the joint 6 is located where the latch 8 is located in the design example shown in FIG. 1.

Such an example is shown in FIGS. 3 and 4, where the housing of the winding device is marked with the reference mark 101. Inside the housing 101 there is a take-up reel, not shown in the drawing, on which a dog leash 103 is wound, which is led out of the housing 101 at the side.

Opposite the exit opening of the dog leash 103 there is a retaining ring 104 on the housing 101, the engagement opening 105 of which is enclosed by the housing 101 and a pivot arm 104a which is hinged to the housing 101 by means of a pivot joint 106. Around this pivot joint 106, the pivot arm 104a can be pivoted in the direction of the arrow 107 to an open position in which the engagement opening 105 is open to the side and forms a kind of hook which can be used to attach the housing 101 to any desired fixing points.

At its end remote from the pivot joint 106, the pivot arm 104a is provided with a locking element in the form of a spring-loaded snap bolt 108 which engages in an opposite snap-in opening 109 located on the housing 101 and fixes the pivot arm 104a in the closed position shown in FIG. 3. The snap bolt 108 is provided with a push button 110, with which the lock can also be released manually if necessary.

According to the invention, in this example of the invention, the housing 101 is provided at its section facing the free end of the pivot arm 104a with a lock tongue 111, which can be inserted into a vehicle seat belt buckle when the retaining ring 104 is open (FIG. 4). This tongue 111 has the shape usual for car seat belt buckles and lies in a space-saving manner in a suitable recess 112 in the free end of the pivot arm 104a when the retaining ring 104 is closed (FIG. 3).

In its function and handling, the winding device as shown in FIGS. 3 and 4 corresponds fully to the winding device as shown in FIGS. 1 and 2.

LIST OF REFERENCES 1 housing; 101 housing
2 take up reel
3 dog leash; 103 dog leash
4 retaining ring; 104 retaining ring
4a pivot arm; 104a pivot arm
5 access opening; 105 access opening
6 pivot joint; 106 pivot joint.
7 arrow; 107 arrow
8 latch; 108 latch
9 snap-in opening; 109 snap-in opening
10 handle elements; 110 push button
11 lock tongue; 111 lock tongue
12 recess; 112 recess

The invention claimed is:

1. A winding device for an animal leash (3,103), in particular for a dog leash, comprising a housing (1,101) which houses the leash (3,103) and has a pull-out limiting device and a retaining ring (4,104) having an engagement opening (5,105), said retaining ring (4,104) having a pivot arm (4a, 104a) which is connected to the retaining ring (4,104) by means a pivot joint (6,106), closes the engagement opening (5,105) of the retaining ring (4,104) in its non-pivoted position and releases the engagement opening (5,105) of the retaining ring (4,104) in its pivoted position,
wherein a lock tongue (11,111) is arranged at the pivot arm (4a, 100a) at its end facing away from the pivot joint (6,106) or at the retaining ring (4,104) at its end facing the pivot arm (4a, 104a), which tongue (11,111) can be inserted into a motor vehicle belt buckle when the retaining ring (4,104) is open.

2. The winding device according to claim 1, wherein the lock tongue (11, 111) extends in the circumferential direction of the retaining ring (4, 104) and, when the retaining ring (4, 104) is closed, lies in a matching recess (12, 112) of the retaining ring (4, 104) or of the pivot arm(4a, 104a).

3. The winding device according to claim 1, wherein the pivot arm (4a, 104a) can be pivoted outwards with respect to the engagement opening (5, 105) of the retaining ring (4, 104).

4. The winding device according to claim 1, wherein the pivot arm (4a, 104a) is provided at its end remote from the pivot joint (6, 106) with a locking element (8, 108; 10, 110) with which the pivot arm (4a, 104a) can be fixed in the closed position.

5. The winding device according to claim 4, wherein the joint (6, 106) supporting the pivot arm (4a, 104a) is designed as a spring joint which elastically holds t the pivot arm (4a, 104a) in the open position.

6. The winding device according to claim 4, wherein the locking element (8, 108; 10, 110) at the end of the pivot arm (4a, 104a) is designed as a spring-loaded snap bolt (8, 108) which is provided with grip elements (10) or a push button (110) for opening by hand.

* * * * *